United States Patent [19]

Hanabata et al.

[11] 4,414,230
[45] Nov. 8, 1983

[54] PLASTIC CONTAINER IMPROVED IN BARRIER PROPERTIES AGAINST GASES AND WATER VAPOR

[75] Inventors: Makoto Hanabata, Takatsuki; Takashi Maruyama, Toyonaka; Katsuji Ueno, Hirakata, all of Japan

[73] Assignee: Sumitomo Chemical Company, Limited, Osaka, Japan

[21] Appl. No.: 312,867

[22] Filed: Oct. 19, 1981

Related U.S. Application Data

[63] Continuation-in-part of Ser. No. 238,132, Feb. 25, 1981, abandoned.

[30] Foreign Application Priority Data

Apr. 2, 1979 [JP] Japan .................................. 54-40029

[51] Int. Cl.³ ...................... B65D 85/00; C08G 63/00
[52] U.S. Cl. .................................. 426/106; 426/407; 428/35; 525/439
[58] Field of Search .......................... 428/35; 525/439; 426/106, 407

[56] References Cited

U.S. PATENT DOCUMENTS

| | | | |
|---|---|---|---|
| 3,960,807 | 6/1976 | McTaggart | 428/35 |
| 4,164,298 | 8/1979 | Nishikawa et al. | 428/35 |
| 4,219,527 | 8/1980 | Edelman et al. | 428/35 |
| 4,226,961 | 10/1980 | Motz | 525/439 |
| 4,284,671 | 8/1981 | Cancio et al. | 428/35 |

FOREIGN PATENT DOCUMENTS

| | | | |
|---|---|---|---|
| 47-41094 | 10/1972 | Japan | 525/439 |
| 55-110153 | 8/1980 | Japan | |
| 55-40029 | 10/1980 | Japan | |

*Primary Examiner*—William R. Dixon, Jr.
*Attorney, Agent, or Firm*—Stevens, Davis, Miller & Mosher

[57] ABSTRACT

A plastic container having improved properties as a barrier against gases and water vapor made from a thermoplastic resin composition comprising (A) an aromatic polyester carbonate composed of an aromatic dicarboxylic acid moiety, an aromatic dihydroxy compound moiety and a carbonate moiety and (B) a polyalkylene terephthalate and/or a polyalkylene oxybenzoate in a ratio of 100 parts by weight of said aromatic polyester carbonate to 100 parts by weight or less of said polyalkylene terephthalate and/or polyalkylene oxybenzoate.

9 Claims, No Drawings

PLASTIC CONTAINER IMPROVED IN BARRIER PROPERTIES AGAINST GASES AND WATER VAPOR

This application is a continuation-in-part application of our prior application Ser. No. 238,132, filed Feb. 25, 1981 now abandoned.

This invention relates to a plastic container which has improved properties as a barrier against gases and water vapor and is made from a novel thermoplastic resin composition. More particularly, this invention pertains to a plastic container which has improved properties as a barrier against gases and water vapor and is made from a composition comprising an aromatic polyester carbonate and a polyalkylene terephthalate and/or a polyalkylene oxybenzoate.

It is well known that the performance requirements of plastics in their fields of use have become increasingly elaborate from year to year. There is also an increasing demand for resins having properties which meet the requirements for particular uses and in addition, have certain fundamental properties such as heat resistance, moldability, mechanical and electrical characteristics.

For instance, when used in food package containers or pharmaceutical package containers, the plastics are required to be sterile or thermally sterilizable. Therefore, the plastics must be sufficiently heat resistant and also have sufficient barrier properties against water vapor and other gases to protect the contents and to withstand the conditions under which the most widely adopted high-pressure steam sterilization (30 minutes at 115° C., 20 minutes at 121° C., or 15 minutes at 126° C.) or flowing-steam sterilization (30 to 60 minutes in flowing steam at 100° C.) is conducted. They are also required to be transparent in order to impart high-grade appearance to the packaged articles.

For the above purposes, plastic containers of polyethylene, polypropylene, polyvinyl chloride, polycarbonate and polyethylene terephthalate have heretofore been employed. All of these materials, however, have both advantages and disadvantages with respect to the above properties and do not fully meet the requirements. Although polyethylene and polypropylene are excellent barriers against water vapor, they do not have a satisfactory transparency. Polyvinyl chloride has excellent transparency and is an excellent barrier against gases, but, like polyethylene, has an inferior heat resistance. Polycarbonate has good transparency and sufficient heat resistance to withstand steam sterilization but is an unsatisfactory barrier against water vapor and other gases. Although polyethylene terephthalate is excellent in both transparency and barrier properties, it only withstands temperatures up to about 70° C., which precludes steam sterilization thereof. Thus, a resin which is transparent, has excellent barrier properties, and has a high heat resistance has not yet been developed.

On the other hand, although known to be a resin having excellent mechanical properties such as tensile strength, flexural strength and the like, thermal properties such as heat distortion temperature, thermal decomposition temperature and the like, electrical and other properties, a polyester comprising an aromatic dicarboxylic acid moiety and an aromatic dihydroxy compound moiety, such as that prepared from an aromatic dicarboxylic acid such as, for example, terephthalic acid or isophthalic acid and an aromatic dihydroxy compound such as, for example, 2,2-bis(4-hydroxyphenyl)-propane (bisphenol-A) has inferior moldability due to its high melting point.

The present inventors previously found, that as a result of efforts to improve the moldability of an aromatic polyester, an aromatic polyester carbonate obtained by the reaction of (a) an aromatic dicarboxylic acid and/or a functional derivative thereof, (b) an aromatic dihydroxy compound and/or a functional derivative thereof, and (c) a diaryl carbonate in a specific ratio has satisfactory moldability, is economical to produce, has polymer properties, and retains the above-mentioned excellent physical properties characteristic of a polyester.

It was further found, as a result of continued extensive research, that by blending such an aromatic polyester carbonate with a polyalkylene terephthalate and/or a polyalkylene oxybenzoate, it is possible further to improve the processibility of the resin and markedly to improve its physical properties such as chemical resistance and, in particular, barrier properties against gases and water vapor, without impairing the transparency of the resin. The resin thus meets the performance requirements for plastic containers, as described above. This finding has led to the accomplishment of this invention.

Japanese Patent Application Kokai (Laid-open) No. 110153/80, discloses a composition comprising an aromatic polyester carbonate and polyalkylene terephthalate. According to this disclosure, the aromatic polyester carbonate is improved in moldability, impact-resistance and solvent-resistance by blending with a polyalkylene terephthalate. However, in this reference, there is no disclosure as to barrier properties against gases and water vapor. Further, no disclosure of a plastic container utilizing the aforesaid barrier properties. The present inventors have found a container which is transparent, has excellent heat-resistance, and has improved properties as a barrier against gases and water vapor, which are high performance characteristics hitherto unknown. The container can be used not only as a mere general packaging container, but also as a container for medicines, foodstuffs, etc., which require sterilization steps. The heat-resistance and barrier properties of the resin permit the sterilization of these containers.

An object of this invention is to provide a container made from a composition which improves the processibility of aromatic polyester carbonates and has greatly improved physical properties, particularly barrier properties against gases and water vapor.

Other objects and advantages of this invention will become apparent from the following description.

According to this invention, there is provided a container made from a thermoplastic resin composition comprising 100 parts by weight of an aromatic polyester carbonate composed of an aromatic dicarboxylic acid moiety, an aromatic dihydroxy compound moiety and a carbonate moiety and 100 parts by weight or less of a polyalkylene terephthalate and/or a polyalkylene oxybenzoate.

As to the composition ratio between the aromatic polyester carbonate and the polyalkylene terephthalate and/or polyalkylene oxybenzoate, it is necessary to employ 100 parts by weight or less of the polyalkylene terephthalate and/or polyalkylene oxybenzoate for 100 parts by weight of the aromatic polyester carbonate. If the amount of polyalkylene terephthalate and/or polyalkylene oxybenzoate exceeds the upper limit, the heat resistance deteriorates, through the flow of the resin during molding becomes better and, hence, the processibility is improved.

The aromatic polyester carbonate used in this invention is obtained from (a) an aromatic dicarboxylic acid and/or a functional derivative thereof, (b) an aromatic dihydroxy compound and/or a functional derivative thereof and (c) a diaryl carbonate or phosgene. Examples of the individual compounds used as the component (a) include terephthalic acid, isophthalic acid, methylterephthalic acid, methylisophthalic acid, diphenyl ether dicarboxylic acid, diphenoxyethanedicarboxylic acid, naphthalenedicarboxylic acid, and ester-forming derivatives thereof such as, for example, lower alkyl esters, phenyl esters, and acid halides.

Examples of typical compounds used as the component (b) are hydroquinone, resorcinol, 4,4'-dihydroxydiphenyl, 2,2-bis(4-hydroxyphenyl)propane (bisphenol-A), 1,1-bis(4-hydroxyphenyl)cyclohexane, 1,1-bis(4-hydroxyphenyl)ethane, bis(4-hydroxyphenyl)methane, 2,2-bis(4-hydroxy-3,5-dibromophenyl)propane, 4,4'-dihydroxydiphenyl sulfone, 1,2-bis(4-hydroxyphenyl)ethane, and ester-forming derivatives thereof. These compounds can be used each alone or in mixtures of two or more. Of these, bisphenol-A is particularly preferred. Examples of diaryl carbonates used as the component (c) include diphenyl carbonate, dicresyl carbonate, di-β-naphthyl carbonate, and bis(2-chlorophenyl) carbonate. The most preferable combination of the above component compounds comprises terephthalic acid (or diphenyl terephthalate), bisphenol-A, and diphenyl carbonate.

The aromatic polyester carbonate for use in the container of this invention may be prepared from the components (a), (b) and (c) by any of the methods of bulk polycondensation, solution polycondensation and interfacial polycondensation.

Examples of polyalkylene terephthalates and polyalkylene oxybenzoates include polyethylene terephthalate, polybutylene terephthalate, polyethylene oxybenzoate and polybutylene oxybenzoate.

In preparing the container of this invention, customary blending methods may be used. For instance, an aromatic polyester carbonate, a polyalkylene terephthalate and/or a polyalkylene oxybenzoate, each in powder or granular form, are blended in a mixer such as Super mixer, Henschel mixer, or a tumbler and then milled together in a molten state by means of an extruder, kneader, or mixing roll. Solution blending may also be used. The mixing may be carried out in any order. For instance, all of the components may be mixed at a time or, alternatively, any one of the components may be admixed portion-wise with other components.

The container of this invention may contain common additives for plastics such as dyes, pigments, fillers, light stabilizers and antistatics in amounts not deleterious to the characteristics of the container such as transparency. If transparency is not a prerequisite, the container can be improved in mechanical strength by incorporation of glass fiber, and the other characteristics of the container may be retained.

The present container produced by techniques such as injection molding and extrusion molding includes various containers and packaging materials where high performance characteristics of engineering resins are required.

The utility of the present container resides in the fact that the present container can be used for purposes for which the conventional plastic containers could not be used. That is, in addition to good appearance or ease of molding, which are performance characteristics originally belonging to containers, the present container has performance characteristics such as transparency, excellence in heat-resistance and barrier properties against gases and water vapor, which could never be found in conventional containers. As a result, the present container has a wide range of uses such as where it is necessary to keep the contents of the container sanitary. This container is especially useful as a packaging materials for food-stuffs, and as a container for medicines, which requires steam-sterization at temperatures as high as 100° to 130° C.

The present invention is illustrated below with reference to Examples, but the invention is not limited thereto. In the Examples, determinations were performed according to ASTM D 648 for deflection temperature (under a load of 18.6 kg/cm$^2$), JIS Z 0208 for water vapor transmission rate, ASTM D 1434-66 for gas transmission rate and ASTM D 256 for impact resistance (Izod test).

EXAMPLE 1

The aromatic polyester carbonate used in this Example was obtained by bulk polymerization from terephthalic acid, bisphenol-A and diphenyl carbonate and had the basic structure:

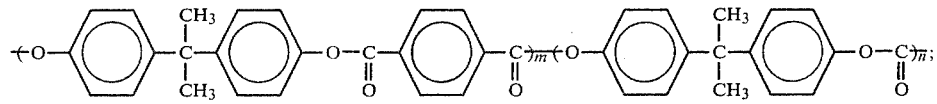

The ester-to-carbonate ratio (m:n) was 70:30 and the limiting viscosity was 0.650 dl/g, as measured in chloroform at 25° C.

The polyester carbonate obtained above and a polyethylene terephthalate (RT-560 of Toyobo Co.) were charged into a Henschel mixer and blended for 30 seconds at room temperature. The resulting blend was dried and, while being kept from moisture, melt-extruded into pellets from a 30-mm extruder adjusted to a resin temperature of 300° to 310° C. The resulting pellets were dried at 120° C. for 5 hours and molded into a 50-ml vessel by using a blow molding machine adjusted to a resin temperature of 280° C. to 290° C. The vessel thus obtained had an excellent gloss and transparency.

The physical properties of the above blend were as shown in Table 1, in which the physical properties of the unblended polyester carbonate and polyethylene terephthalate are also shown for comparison. It is seen from Table 1 that by blending with polyethylene terephthalate, the aromatic polyester carbonate is markedly improved as a barrier against both water vapor and oxygen and also has improved flow properties and processibility.

TABLE 1

| Polyester carbonate to polyethylene terephthalate ratio (% by weight) | Deflection temperature under load °C. | Water vapor transmission rate gmm/m²/24 hr | Oxygen transmission rate CC·cm/cm²seccmHg | Izod impact resistance* Kg·cm/cm² | Cylinder temp. at which bar flow length becomes 35 cm °C. |
|---|---|---|---|---|---|
| 100/0 | 170 | 5.6 | 128 (× $10^{-12}$) | 23 | 352 |
| 80/20 | 133 | 3.4 | 34 | 21 | 301 |
| 70/30 | 128 | 3.0 | 20 | 19 | 289 |
| 0/100 | 73 | 1.8 | 7 | 5 | — |

Note:
*6.4 mmt, 0.25 R V-notch

EXAMPLE 2

The aromatic polyester carbonate used in this Example had the same basic structure as that described in Example 1, an ester-to-carbonate ratio of 50:50 and a limiting viscosity number of 0.655 dl/g, as measured in chloroform at 25° C. This polyester carbonate and a polyethylene terephthalate (RT-560 of Toyobo Co.) were milled together and molded into articles in the same manner as in Example 1. The physical properties of the articles thus obtained were as shown in Table 2.

TABLE 2

| Polyester carbonate to polyethylene terephthalate ratio (% by weight) | Deflection temperature under load °C. | Water vapor transmission rate gmm/m²/24 hr | Oxygen transmission rate CC·cm/cm²seccmHg | Izod impact resistance* Kg·cm/cm² | Cylinder temp. at which bar flow length becomes 35 cm °C. |
|---|---|---|---|---|---|
| 100/0 | 162 | 6.1 | 138 (× $10^{-12}$) | 21 | 339 |
| 80/20 | 131 | 3.6 | 38 | 19 | 283 |
| 70/30 | 124 | 3.2 | 24 | 18 | 272 |
| 0/100 | 73 | 1.8 | 7 | 5 | — |

Note:
*6.4 mmt, 0.25 R V-notch

EXAMPLE 3

In this Example the chemical resistance was examined. The same aromatic polyester carbonate (I) as was used in Example 1 and the same aromatic polyester carbonate (II) as used in Example 2 were each mixed with a polyethylene terephthalate (RT-560 of Toyobo Co.) in the ratios shown in Table 3 and each mixture was compression molded into test specimens. The resulting transparent test specimens were immersed in toluene or trichloroethylene at room temperature for 24 hours. After the immersion, each test specimen was inspected for change in appearance. The results obtained were as shown in Table 3. It is seen that the chemical resistance was improved by blending with polyethylene terephthalate.

TABLE 3

| Composition (% by weight) | | | | Composition (% by weight) | | | |
|---|---|---|---|---|---|---|---|
| | Polyethylene | Appearance | | | Polyethylene | Appearance | |
| (I) | terephthalate | Toluene | Trichloroethylene | (II) | terephthalate | Toluene | Trichloroethylene |
| 100 | 0 | Opaque | Opaque | 100 | 0 | Opaque; whitening | Opaque |
| 80 | 20 | Transparent; no change | Transparent; no change | 80 | 20 | Transparent; no change | Transparent; no change |
| 60 | 40 | Transparent; no change | Transparent; no change | 60 | 40 | Transparent; no change | Transparent; no change |

EXAMPLE 4

Eighty parts by weight of the same aromatic polyester carbonate as was used in Example 1 were milled together with twenty parts by weight of polyethylene oxybenzoate and molded in a manner similar to that in Example 1 to obtain transparent molded articles. The molded articles were examined for various physical properties in the same manner as in Example 1. It was found that as compared with the unblended aromatic polyester carbonate, the processibility was much improved and the barrier properties and chemical resistance were also improved.

EXAMPLE 5

The aromatic polyester carbonate used in this Example was obtained from isophthalic acid, bisphenol-A and phosgene by interfacial polycondensation in a methylene chloride-aqueous sodium hydroxide system and has the following basic structure:

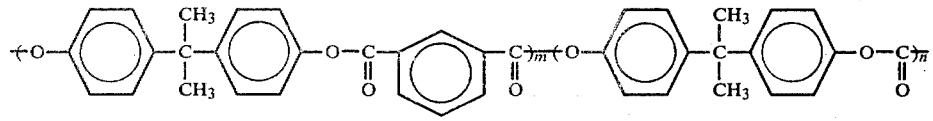

The ester-to-carbonate ratio (m:n) was 50:50 and the limiting viscosity was 0.600 dl/g, as measured in chloroform at 25° C. In a manner similar to that in Example 1, 70 parts by weight of the above polyester carbonate and 30 parts by weight of polyethylene terephthalate were blended, pelletized and blow-molded to obtain a blown vessel which showed a water transmission rate of 3.1 gmm/m²/24 hour.

What is claimed is:

1. A plastic container made from a thermoplastic resin composition comprising (A) an aromatic polyester carbonate composed of an aromatic dicarboxylic acid moiety, an aromatic dihydroxy compound moiety and a carbonate moiety and (B) at least one member selected from polyalkylene terephthalates and polyalkylene oxybenzoates, in a ratio of 100 parts by weight of (A) to 100 parts by weight or less of (B), said thermoplastic resin composition having improved barrier properties against gases and water vapor.

2. A plastic container according to claim 1, wherein the aromatic polyester carbonate is obtained from (a) at least one member selected from aromatic dicarboxylic acids and functional derivatives thereof, (b) at least one member selected from aromatic dihydroxy compounds and functional derivatives thereof and (c) a diaryl carbonate or phosgene.

3. A plastic container according to claim 2, wherein the component (a), which is at least one member selected from aromatic dicarboxylic acids and functional derivatives thereof, is selected from the group consisting of terephthalic acid, isophthalic acid, methylterephthalic acid, methylisophthalic acid, diphenyl ether dicarboxylic acid, diphenoxy-ethanedicarboxylic acid, a naphthalenedicarboxylic acid, a lower alkyl ester thereof, a phenyl ester thereof, and a halide thereof.

4. A plastic container according to claim 2, wherein the component (b), which is at least one member selected from aromatic dihydroxy compounds and functional derivatives thereof, is selected from the group consisting of hydroquinone, resorcinol, 4,4'-dihydroxydiphenyl, 2,2-bis(4-hydroxyphenyl) propane (bisphenol-A), 1,1-bis(4-hydroxyphenyl)cyclohexane, 1,1-bis(4-hydroxyphenyl)ethane, bis(4-hydroxyphenyl)methane, 2,2-bis(4-hydroxy-3,5-dibromophenyl)propane, 4,4'-dihydroxydiphenyl sulfone, 1,2-bis(4-hydroxyphenyl)ethane, and an ester-forming derivative thereof.

5. A plastic container according to claim 2, wherein the diaryl carbonate, i.e. component (c), is selected from the group consisting of diphenyl carbonate, dicresyl carbonate, di-β-naphthyl carbonate, and bis(2-chlorophenyl) carbonate.

6. A plastic container according to claim 2, wherein the aromatic polyester carbonate is obtained from (a) terephthalic acid or diphenyl terephthalate, (b) 2,2-bis(4-hydroxyphenyl)propane (bisphenol-A), and (c) diphenyl carbonate.

7. A plastic container according to claim 1, wherein the polyalkylene terephthalate is polyethylene terephthalate or polybutylene terephthalate.

8. A plastic container according to claim 1, wherein the polyalkylene oxybenzoate is polyethylene oxybenzoate or polybutylene oxybenzoate.

9. A plastic container made from a thermoplastic resin composition comprising (A) an aromatic polyester carbonate composed of an aromatic dicarboxylic acid moiety, an aromatic dihydroxy compound moiety and a carbonate moiety and (B) at least one member selected from polyalkylene terephthalates and polyalkylene oxybenzoates, in a ratio of 100 parts by weight of (A) to 100 parts by weight or less of (B), said thermoplastic resin composition having improved barrier properties against gases and water vapor, said container containing food or medicine.

* * * * *